US 9,380,146 B1

(12) United States Patent
Gopalakrishnan et al.

(10) Patent No.: US 9,380,146 B1
(45) Date of Patent: Jun. 28, 2016

(54) SYSTEM AND METHOD TO FACILITATE CONVERSION BETWEEN VOICE CALLS AND TEXT CALLS

(75) Inventors: Varadarajan Gopalakrishnan, Cupertino, CA (US); Kiran K. Edara, Cupertino, CA (US)

(73) Assignee: Amazon Technologies, Inc., Reno, NV (US)

( * ) Notice: Subject to any disclaimer, the term of this patent is extended or adjusted under 35 U.S.C. 154(b) by 403 days.

(21) Appl. No.: 13/420,493

(22) Filed: Mar. 14, 2012

(51) Int. Cl.
*H04M 11/00* (2006.01)
*H04M 1/725* (2006.01)

(52) U.S. Cl.
CPC .................. *H04M 1/72552* (2013.01)

(58) Field of Classification Search
CPC .................................................. H04M 2201/40
USPC ...................................... 379/88.01; 455/563
See application file for complete search history.

(56) References Cited

U.S. PATENT DOCUMENTS

| 8,407,048 | B2* | 3/2013 | Rogers | 704/235 |
| 9,203,979 | B1* | 12/2015 | Jaccino | H04M 19/044 |
| 2003/0097262 | A1* | 5/2003 | Nelson | 704/235 |
| 2011/0003585 | A1* | 1/2011 | Wang | H04M 1/72583 455/418 |
| 2011/0075821 | A1* | 3/2011 | Michaelis | H04M 3/42391 379/88.13 |
| 2011/0111805 | A1* | 5/2011 | Paquier | H04M 1/72552 455/563 |

* cited by examiner

*Primary Examiner* — Joseph T Phan
(74) *Attorney, Agent, or Firm* — Lowenstein Sandler LLP

(57) ABSTRACT

Methods and systems for converting voice calls into text calls are disclosed. A method includes determining that a first user device is to be switched from a voice call mode to a text call mode, and sending an indication that the first user device is to be switched from the voice call mode to the text call mode to a server that is in communication with a second user device. The method further includes presenting to a user of the first user device a voice call from the second user device in text format.

22 Claims, 13 Drawing Sheets

SYSTEM AND METHOD TO FACILITATE CONVERSION BETWEEN VOICE CALLS AND TEXT CALLS

BACKGROUND

A large and growing population of users is using mobile phones for a variety of purposes, including keeping in touch with family members, conducting business, and having access to a telephone in the event of an emergency. However, sometimes users may not be able to effectively communicate with each other via mobile phones. For example, when a user is in a noisy environment (e.g., at a bar, a concert or a conference), the user may not be able to hear the incoming call or to understand everything the caller is saying. This negatively impacts the user experience with mobile phones, as well as user satisfaction of mobile phone networks.

BRIEF DESCRIPTION OF THE DRAWINGS

Embodiments of the invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Methods and systems for converting user device voice calls into text calls are disclosed. A user device may be any mobile or content rendering device. Examples of such user devices include cellular telephones, personal digital assistants (PDAs), portable media players, tablet computers, netbooks, electronic book readers, and the like.

In one embodiment, a first user device detects that a text call condition is satisfied and notifies a server that the first user device should be switched from a voice call mode to a text call mode. The text call condition may be satisfied if, for example, the first user device is in a noisy environment, a signal strength of the first user device is low, or a user of the first user device has requested a switch from a voice call mode to a text call mode. The server may be a service provider server or a network operator server.

When the server receives the above notification from the first user device, the server causes voice packets generated for the first user device by a second user device to be converted into text packets. The conversion may be performed by the second user device, by the service provider server, by the network operator server, or by the first user device itself. The first user device will then present the conversation from the second user device in the visual (e.g., text) form on the screen.

A voice call mode pertains to calls involving exchange of voice data between participants, including, for example, circuit-switched telephone calls, voice over IP (VoIP) telephone calls, and so on. A call in a voice call mode may be between 2 or more participants and may include a direct voice call between participants referred to as a point-to-point voice call, a teleconference call (e.g., a voice call between participants using a bridge), a video conference call (a teleconference using video technology), a web conference cal (a teleconference using collaborative web browsing), and so on. A text call mode refers to real-time communications that are presented to a participant in a visual form including, for example, text data, image data, sign language data, and so on.

With embodiments of the invention, a user device can dynamically (in real time) switch between a voice call mode and a text call mode depending on a change in the environment and/or a user preference. As a result, the user experience with user devices is improved, as well as user satisfaction with a network operator's service.

Figure 1:
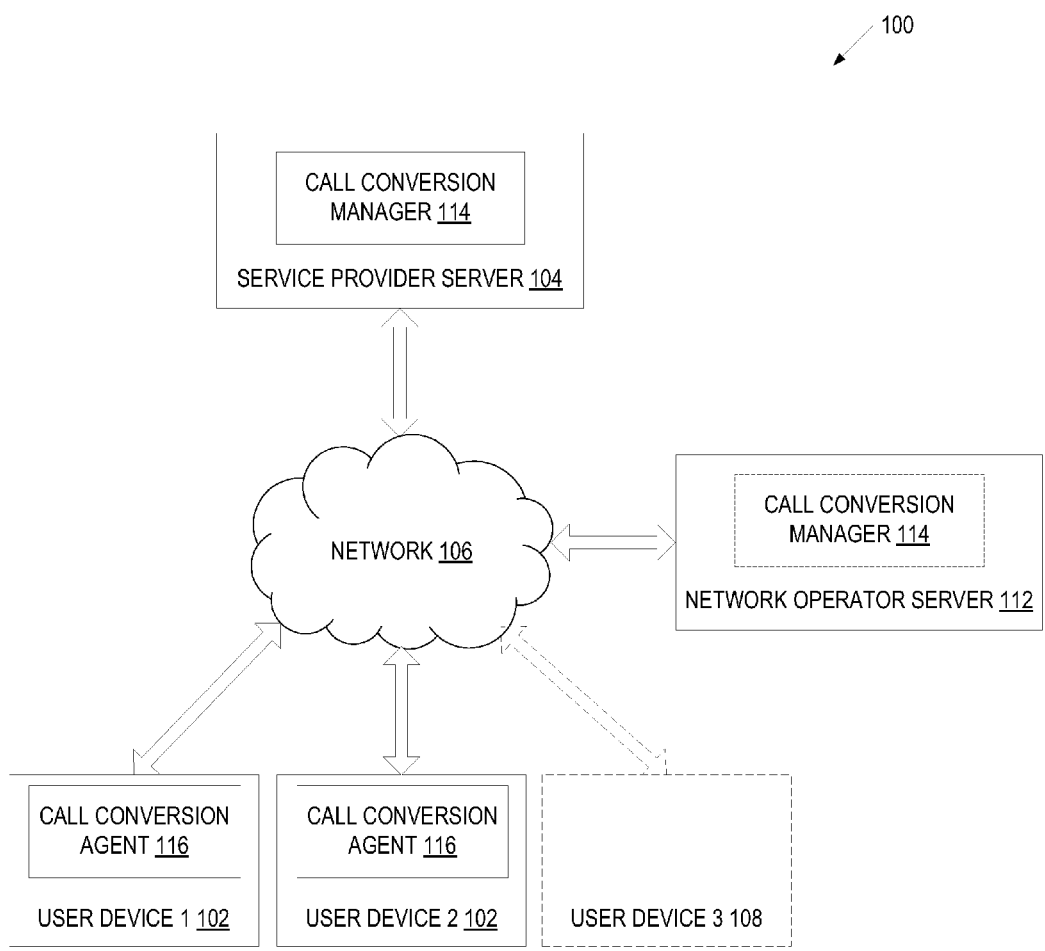
FIG. 1 is a block diagram of an exemplary network architecture in which embodiments of the invention may operate.

FIG. 1 is a block diagram of exemplary network architecture 100 in which embodiments of the invention may operate. The network architecture 100 may include a service provider service provider server 104 and multiple user devices 102 coupled to the service provider service provider server 104 via a network 106 (e.g., public network such as the Internet, private network such as a local area network (LAN) or an operator network).

The user devices 102 are variously configured with different functionality to enable voice communication and/or consumption of one or more types of media items. The media items may be any type or format of digital content, including, for example, electronic texts (e.g., eBooks, electronic magazines, digital newspapers), digital audio (e.g., music, audible books), digital video (e.g., movies, television, short clips), images (e.g., art, photographs), multi-media content and software updates. The user devices 102 may include any type of computing devices such as electronic book readers, portable digital assistants, mobile phones, laptop computers, portable media players, tablet computers, cameras, video cameras, netbooks, notebooks, desktop computers, gaming consoles, DVD players, media centers, and the like.

The service provider server 104 (also referred to as a cloud server) may be a content provider server, an access point provider server, or any other server that provides various services to user devices 102 via the network 106. In one embodiment, the service provider server 104 downloads items, upgrades, and/or other information to the user devices 102 via the network 106. The service provider server 104 also receives various requests, instructions and other data from the user devices 102 via the network 106. The service provider server 104 may include one or more machines (e.g., one or more server computer systems, routers, gateways) that have processing and storage capabilities to provide the above functionality.

Communication between the service provider server 104 and a user device 102 may be enabled via any communication infrastructure. One example of such an infrastructure includes a combination of a wide area network (WAN) or a VPN and wireless infrastructure, which allows a user to use the user device 102 to purchase items and consume items without being tethered to the service provider server 104 via hardwired links. The wireless infrastructure may be provided by a network operator 112 that can be implemented using various data processing equipment, communication towers, etc. Alternatively, or in addition, the network operator 112 may rely on satellite technology to exchange information with the user device 102. Yet alternatively, or in combination, the wireless infrastructure may be provided by an access point (e.g., WiFi access point) provider system.

In some implementations, the communication infrastructure may also include a communication-enabling system that serves as an intermediary in passing information between the service provider server 104 and the wireless network operator 112. The communication-enabling system may communicate with the wireless network operator 112 via a dedicated channel, and may communicate with the service provider server 104 via a non-dedicated communication mechanism, e.g., a public network such as the Internet. The service provider server 104 may pay the network operator 112 a fee based on the aggregate use of the network operator system by all of the user devices 102. The service provider server 104 may recoup these costs through fees charged to the end-users separately or as part of other purchases (e.g., purchase of digital content) made by the end-users. Alternatively, the network operator 112 may submit bills directly to individual users, or may submits bills to either the service provider server 104 (in aggregate) or to the individual users, at the option of the individual respective users.

Embodiments of the invention allow user devices 102 to switch between a voice call mode of operation and a text call mode of operation. For example, when user device 1 places a call for user device 2, user device 2 may be either in a voice call mode or in a text call mode. If user device 2 is in a voice call mode, the user of user device 2 listens to the audio associated with the call of user device 1. If user device 2 is in a text call mode, the call of user device 1 is displayed in text format on the screen of user device 2. In one embodiment, user device 2 hosts a call conversion agent 116 which detects that a text call condition is satisfied and notifies the service provider server 104 that user device 2 should be switched from a voice call mode to a text call mode. The text call condition may be satisfied if, for example, user device 2 is in a noisy environment, a signal strength of user device 2 is low, or a user of user device 2 has requested a switch from a voice call mode to a text call mode. The call conversion agent 116 may later detect that the text call condition is no longer satisfied (e.g., user device 2 is no longer in a noisy environment, a signal strength of user device has improved, or a user of user device 2 has requested a switch from a text call mode to a voice call mode), and notifies the service provider server 104 that user device 2 should be switched from a text call mode to a voice call mode.

In one embodiment, the service provider server 104 hosts a call conversion manager 114 that receives the notification that user device 2 has requested a switch from a voice call mode to a text call mode, and causes voice packets of user device 1 to be converted into text packets and to be provided to user device 2. The conversion may be performed by the call conversion manager 114 or by user device 1. In another embodiment, the call conversion agent 116 of user device 2 notifies the network operator server 112, which hosts a call conversion manager 114 that converts voice packets generated by the user device 1 into text packets and provides the text packets to user device 2. User device 2 then uses the text packets to display the voice call of user device 1 in text format.

Similarly, user device 1 can host a call conversion agent 116 that allows user device 1 to switch between a voice call mode and a text call mode. As will be discussed in more detail below, the call conversion agent 116 may include a conversion requestor module to request a switch between a voice call mode and a text call mode, and optionally a conversion provider module to perform or participate in a conversion between voice packets and text packets.

As discussed above, in one embodiment, the text part of the call is displayed on the same user device 102 that has requested voice-to-text conversion. In another embodiment, user device 102 requests voice-to-text conversion but the resulting text of the conversation is displayed on a different user device such as user device 108, which may be a personal computer, a tablet, a television, and so on. In addition, user devices 102 may be of the same type (e.g., mobile phones) or of different types (e.g., user device 1 may be a mobile phone and user device 2 may be a conference phone, a VoIP phone, a personal computer hosting a telephony application, etc.).

Figure 2:
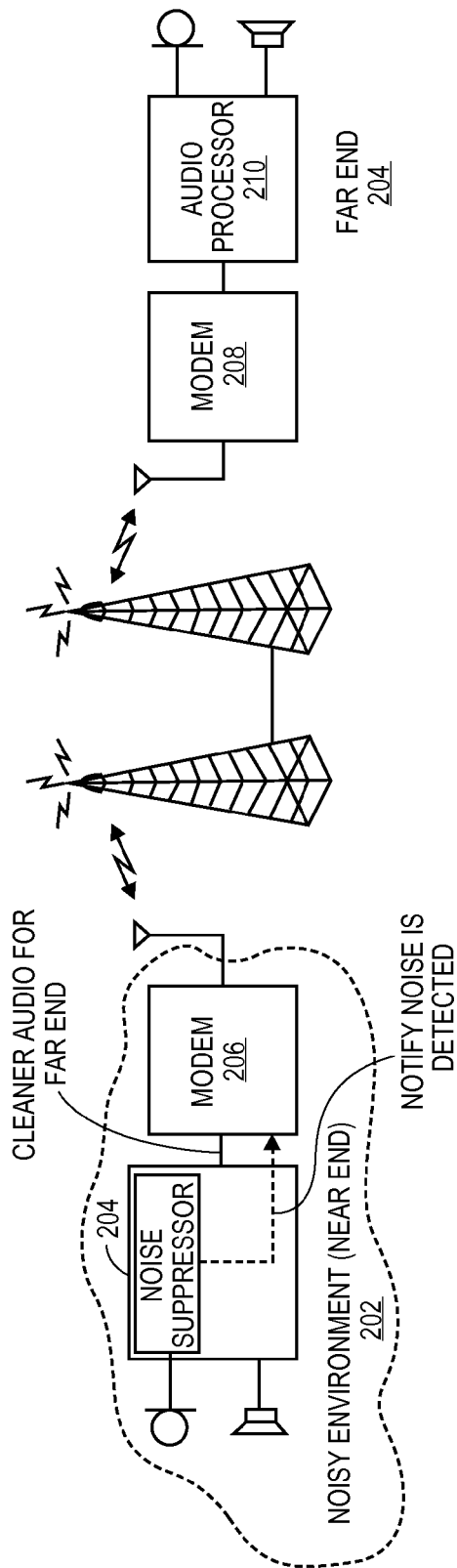
FIG. 2 illustrates an exemplary cellular audio path utilizing a noise suppressor to trigger a conversion of a voice call into a text call in accordance with one embodiment of the invention.

FIG. 2 illustrates an exemplary cellular audio path utilizing a noise suppressor to trigger a conversion of a voice call into a text call in accordance with one embodiment of the invention. The illustrated cellular audio path allows a communication between user device A at near end 202 and user device B at far end 204. User device A hosts audio processor 204 and modem 206. User device B hosts audio processor 210 and modem 208. Audio processor 204 includes a noise suppressor that operates by suppressing the near end noise to allow user device B at the far end to hear clearly the audio produced by user device A at the near end. The noise suppressor may suppress noise by sampling the audio to identify noise (e.g., by finding a portion of audio that contains all noise and no signal) and then removing the identified noise from the audio. In one embodiment, the audio processor 204 uses the signal-to-noise ratio at the input of the noise suppressor and the signal-to-noise ratio at the output of the noise suppressor to determine whether user device A is in a noisy environment. If so, the audio processor 204 notifies modem 206 that user device A operates in a noisy environment. Modem 206 then sends a notification to a server to request a switch from a voice call mode to a text call mode. The server may be a service provider server or a network operator server that causes voice packets of user device B to be converted into text packets and provided to user device A, as will be discussed in more detail below.

In one embodiment, the audio processor 204 may determine that user device A no longer operates in a noisy environment. Modem 206 may then send a notification to the server to request a switch from a text call mode back to a voice call mode. In response, the server will discontinue converting voice packets of user device B to text packets and will provide voice packets of user device B to user device A.

Figure 3:
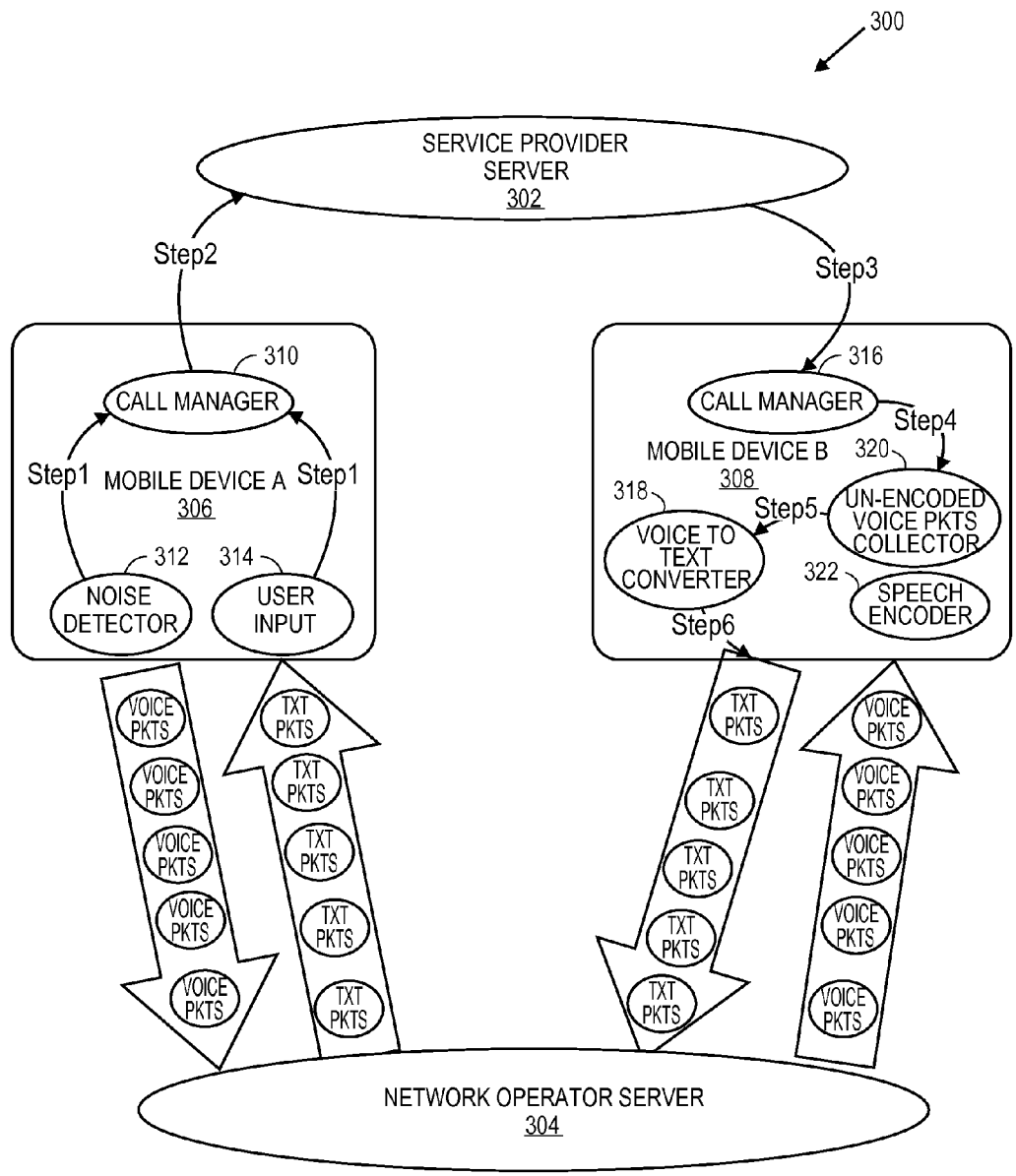
FIG. 3 is a block diagram of one embodiment of a system for converting voice calls into text calls using a voice-to-text converter of a user device.

FIG. 3 is a block diagram of one embodiment of a system 300 for converting voice calls into text calls using a voice-to-text converter of a user device. System 300 includes mobile devices 306 and 308, a cloud server 302 and a network operator server 304. Each mobile device 306, 308 operates in a voice call mode and exchanges voice packets with other mobile devices via the network operator 304.

In one embodiment, mobile device 306 includes a call manager 310 which detects that a text call condition is satisfied. The text call condition may be satisfied if noise detector 312 determines that the user device 305 operates in a noisy environment or if a user interface module 314 receives a user request to switch to a text call mode. The call manager 310 then informs the cloud server 302 that the user device 306 should switch from a voice call mode to a text call mode, and the cloud server 302 passes a corresponding notification to the mobile device 308.

The mobile device 308 includes a call manager 316 that instructs an un-encoded voice packets collector 320 to stop encoding voice packets. In response, the un-encoded voice packets collector 320 refrains from providing un-encoded voice packets to a speech encoder 322 and instead provides the un-encoded voice packets to a voice-to-text converter 318. The voice-to-text converter 318 converts the un-encoded voice packets into text packets and provides the text packets to the mobile device 306 via the network operator server 304. The voice-to-text converter 318 may also request the network operator 304 to change quality of service parameters (e.g., from streaming call parameters corresponding to the voice call mode to interactive data session parameters corresponding to the text call mode).

Subsequently, the call manager 310 may detect that a text call condition is no longer satisfied (e.g., if the noise level is reduced) and inform the cloud server 302 that the user device 306 should switch from a text call mode back to a voice call mode, and the cloud server 302 passes a corresponding notification to the mobile device 308, which will no longer perform the conversion and will resume providing voice packets to the mobile device 306 via the network server 304. The mobile device 308 may also request the network operator server 304 to change quality of service parameters for the mobile device 306 back (e.g., from interactive data session parameters to streaming call parameters).

In an alternative embodiment, when the call manager 310 detects that a text call condition is satisfied, the user of the mobile device 306 may be presented with an option to switch to a text call mode (e.g., the screen of the mobile device 306 may present a message informing the user about a high noise level and provide a button or link for switching to a text call mode). If the user selects this option, the user may be presented with a user interface facilitating user input of a text message or a text messaging application may be automatically invoked on the mobile device 306. The mobile device 306 may then convert text packets into voice packets and provide the voice packets to the mobile device 308 via the network operator server 304.

Figure 4:
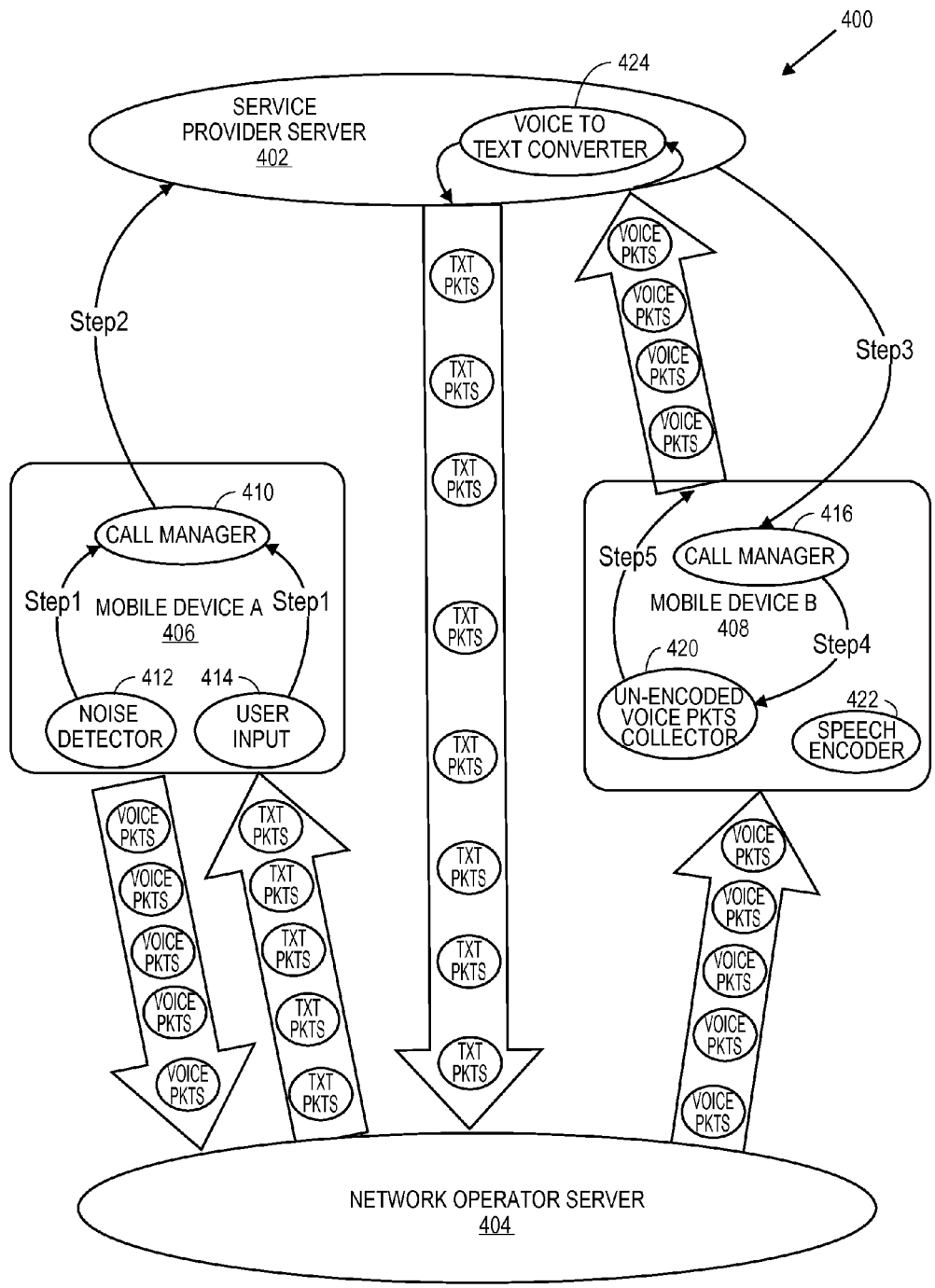
FIG. 4 is a block diagram of one embodiment of a system for converting voice calls into text calls using a voice-to-text converter of a service provider server.

FIG. 4 is a block diagram of one embodiment of a system 400 for converting voice calls into text calls using a voice-to-text converter of a service provider server. System 400 includes mobile devices 406 and 408, a cloud server 402 and a network operator server 404. Each mobile device 406, 408 operates in a voice call mode and exchanges voice packets with other mobile devices via the network operator 404.

In one embodiment, mobile device 406 includes a call manager 410 which detects that a text call condition is satisfied. The text call condition may be satisfied if noise detector 412 determines that the user device 405 operates in a noisy environment or if a user interface module 414 receives a user request to switch to a text call mode. The call manager 410 then informs the cloud server 402 that the user device 406 should switch from a voice call mode to a text call mode, and the cloud server 402 passes a corresponding notification to the mobile device 408.

The mobile device 408 includes a call manager 416 that instructs an un-encoded voice packets collector 420 to stop encoding voice packets. In response, the un-encoded voice packets collector 420 refrains from providing un-encoded voice packets to a speech encoder 422 and instead provides the un-encoded voice packets to the cloud server 402. The cloud server 402 hosts a voice-to-text converter 424 that converts the un-encoded voice packets of the mobile device 408 into text packets and provides the text packets to the mobile device 406 via the network operator server 404. The cloud server 402 may also request the network operator 404 to change quality of service parameters for the mobile device 406 (e.g., from streaming call parameters to interactive data session parameters).

Subsequently, the call manager 410 may detect that a text call condition is no longer satisfied (e.g., if the noise level is reduced) and inform the cloud server 402 that the user device 406 should switch from a text call mode back to a voice call mode, and the cloud server 402 passes a corresponding notification to the mobile device 408, which will no longer provide un-encoded voice packets to the cloud server 402 and will resume providing encoded voice packets to the mobile device 406 via the network operator server 404. The mobile device 408 may also request the network operator server 404 to change quality of service parameters for the mobile device 406 back (e.g., from interactive data session parameters to streaming call parameters).

In an alternative embodiment, when the call manager 410 detects that a text call condition is satisfied, the user of the mobile device 406 may be presented with an option to switch to a text call mode (e.g., the screen of the mobile device 406 may present a message informing the user about the noise and provide a button or link for switching to a text call mode). If the user selects this option, the user may be presented with a user interface facilitating user input of a text message or a text messaging application may be automatically invoked on the mobile device 406. The mobile device 406 may then provide text packets to the service provider server 402 which will convert the text packets into voice packets and provide the voice packets to the mobile device 408.

Figure 5:
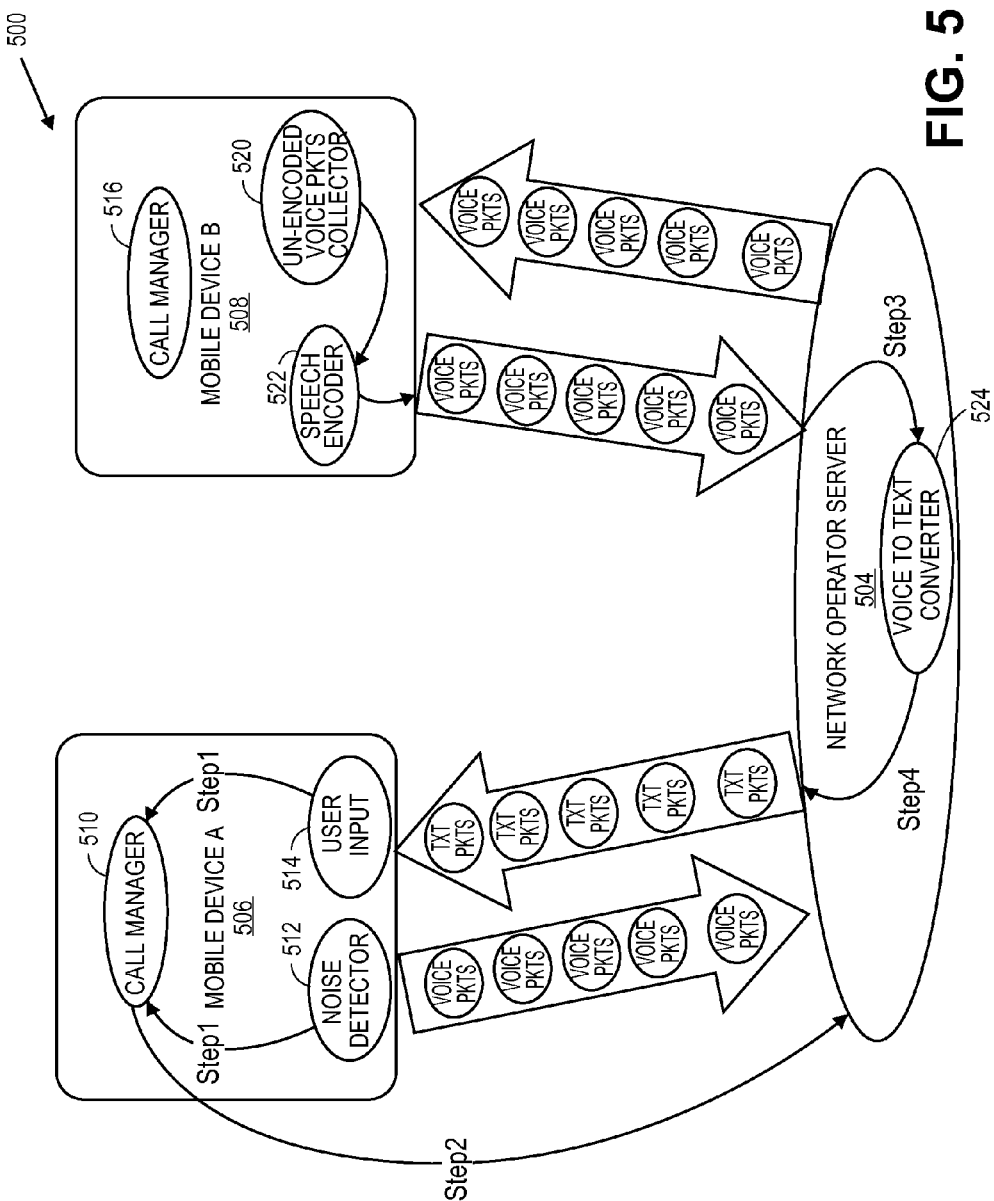
FIG. 5 is a block diagram of one embodiment of a system for converting voice calls into text calls using a voice-to-text converter of a network operator server.

FIG. 5 is a block diagram of one embodiment of a system 500 for converting voice calls into text calls using a voice-to-text converter of a network operator server. System 500 includes mobile devices 506 and 508, and a network operator server 504. Each mobile device 506, 508 operates in a voice call mode and exchanges voice packets with other mobile devices via the network operator 504.

In one embodiment, mobile device 506 includes a call manager 510 which detects that a text call condition is satisfied. The text call condition may be satisfied if noise detector 512 determines that the user device 505 operates in a noisy environment or if a user interface module 514 receives a user request to switch to a text call mode. The call manager 510 then informs the network operator server 504 that the user device 506 should switch from a voice call mode to a text call mode.

In the illustrated embodiment, the mobile device 508 does not participate in conversion and is unaware of the conversion. In particular, an un-encoded voice packets collector 520 of the mobile device 508 provides un-encoded voice packets to a speech encoder 522, which then provides the encoded voice packets to the network operator server 504 for transfer to the mobile device 506. The network operator server 504 hosts a voice-to-text converter 524 that decodes the encoded voice packets, converts them into text and provides the text packets to the mobile device 506.

In an alternative embodiment (not shown), the network operator server 504 does not perform the conversion. Rather, the network operator server 504 provides voice packets to the user device 506, which hosts a voice-to-text convert for converting the voice packets into text packets.

Subsequently, the call manager 510 may detect that a text call condition is no longer satisfied (e.g., if the noise level is reduced) and informs the network operator server 504 that the user device 506 should switch from a voice call mode to a text call mode. The network operator server 504 will then discontinue converting voice packets of the mobile device 508 into text packets and will resume providing voice packets of the mobile device 508 to the mobile device 506.

In an alternative embodiment, when the call manager 510 detects that a text call condition is satisfied, the user of the mobile device 506 may be presented with an option to switch to a text call mode (e.g., the screen of the mobile device 506 may present a message informing the user about the noise and provide a button or link for switching to a text call mode). If the user selects this option, the user may be presented with a user interface facilitating user input of a text message or a text messaging application may be automatically invoked on the mobile device 506. The mobile device 506 may then pass text packets to the network operator server 504, which will convert the text packets into voice packets and provide the voice packets to the mobile device 508.

Figure 6:
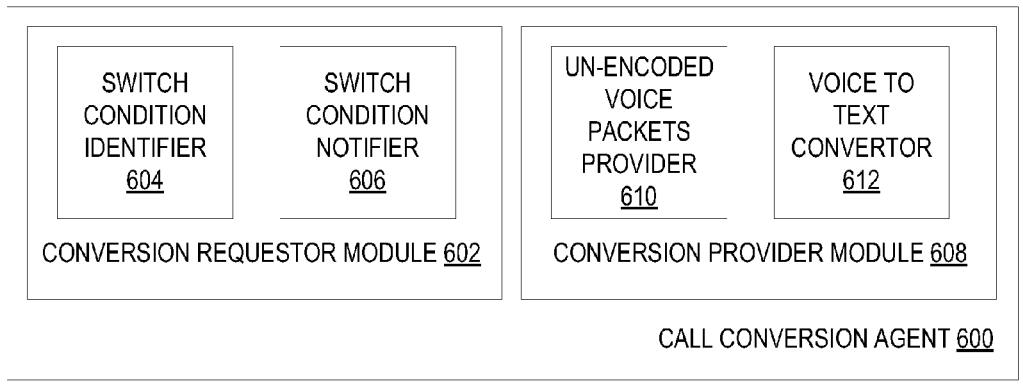
FIG. 6 is a block diagram of one embodiment of a call conversion agent.

FIG. 6 is a block diagram of one embodiment of a call conversion agent 600 hosted by a user device. The call conversion agent 600 may be the same as call conversion agent 116 of FIG. 1 and may include a conversion requestor module 602 containing a switch condition identifier 604 and a switch notifier 606. In some embodiments, in which the user device participates in, or performs voice-to-text conversion, the call conversion agent 600 also includes a conversion provider module 608 containing an un-encoded voice packets provider 610 and/or a voice-to-text convertor 612. The components of the call conversion agent 600 may represent modules that can be combined together or separated into further modules, according to some embodiments.

The switch condition identifier 604 detects that a text call condition is satisfied. The switch condition identifier 604 may detect that a text call condition is satisfied when the user device is involved in a voice call with another user device, where the user device may be the initiator of the voice call with the other user device or the recipient of the voice call. Alternatively, the switch condition identifier 604 may detect that a text call condition is satisfied when the user device is not involved in any voice calls. The text call condition may be satisfied if, for example, the switch condition identifier 604 determines that the user device is in a noisy environment, or determines that signal strength of the user device is low, or receives a user request to switch from a voice call mode to a text call mode.

In one embodiment, if the text call condition is satisfied, the switch condition identifier 604 provides to the user an option to switch to a text call mode (e.g., by presenting on the screen of the user device a message informing the user about the noise and providing a button or link for switching to a text call mode). If the user selects this option, the user may be presented with a user interface facilitating user input of a text message or a text messaging application may be automatically invoked on the user device.

The switch condition notifier 606 notifies a server that the user device should be switched from a voice call mode to a text call mode. The server may be a service provider server or a network operator server. As a result of this notification, a user of the user device will no longer listen to the call of the calling party but rather view the call in text format on the screen of the user device. The user device may operate in a text call mode only during the current conversation or for a predefined time interval, and then automatically switch to a voice call mode. Alternatively, the user device may operate in a text call mode until the switch condition identifier 604 determines that a text call condition is no longer satisfied.

The switch condition identifier 604 may determine that the text call condition is no longer satisfied if, for example, the user device is not in a noisy environment anymore or signal strength of the user device is no longer low, or the user requests a switch from a text call mode to a voice call mode. The switch condition identifier 604 can make this determination when the user device is involved in a call with another user device or when the user device is not involved in any calls. The switch condition identifier 604 may then invoke the switch condition notifier 606 to inform the server that the user device should be switched back to a voice call mode.

As discussed above, in some embodiments, a user device is involved in a voice-to-text conversion for another user device. In these embodiments, the call conversion agent 600 of the user device includes a conversion provider module 606 which is activated when the user device is notified by the server that one or more other participants of the call operate in a text call mode. The conversion provider module 608 may include an un-encoded voice packets provider 610 that provides raw, un-encoded voice packets to the server for conversion into text packets. Alternatively, conversion provider module 608 may include a local voice-to-text convertor 606, and the un-encoded voice packets provider 610 may provide raw, un-encoded voice packets to the local voice-to-text convertor 606 that converts un-encoded voice packets into text packets and provides the text packets to the other user device(s) via the network operator.

Further, as discussed above, in some embodiments, a user device can be involved in a text-to-voice conversion. In these embodiments, the voice-to-text convertor 606 may be configured to convert text packets into voice packets and provide the voice packets to the other user device via the network operator.

Figure 7:
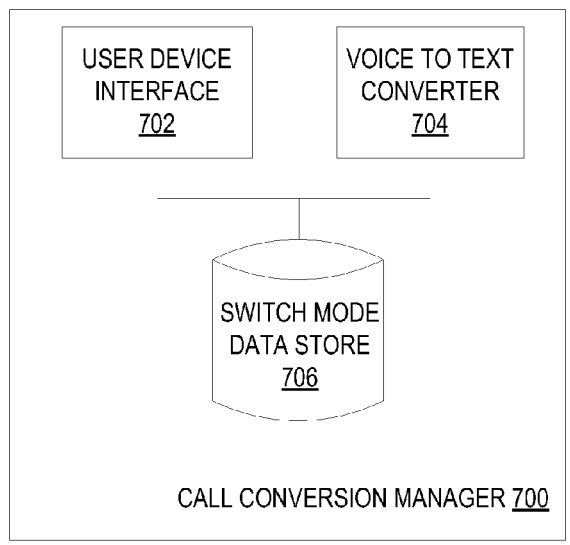
FIG. 7 is a block diagram of one embodiment of a call conversion manager.

FIG. 7 is a block diagram of one embodiment of a call conversion manager 700 hosted by a server. The call conversion manager 700 may be the same as call conversion manager 114 of FIG. 1. The call conversion manager 700 may include a user device interface 702, a switch mode data store 706, and optionally a voice-to-text converter 704. The components of the call conversion manager 700 may represent modules that can be combined together or separated into further modules, according to some embodiments.

The user device interface 702 receives a notification from a user device (e.g., user device A) that the user device should be switched to a different mode of operation (e.g., from a voice call mode to a text call mode, or vice versa) and stores this information in the switch mode data store 706. Optionally, the user device interface 702 may notify another user device (user device B) or multiple other users (e.g., in case of a teleconference) that user device A is switching to a different mode of operation.

In one embodiment, the call conversion manager 700 also includes a voice-to-text converter 704 that receives voice packets for user device A from the user device B, confirms that user device A operates in a text call mode A (based on data stored in the switch mode data store 706) and converts the voice packets into text packets. Alternatively, or in addition, the voice-to-text converter 704 may receive text packets from user device A, confirm that user device B operates in a voice call mode and convert the text packets into voice packets. If more than 2 user devices are involved in the call, the voice-to-text converter 704 may convert the text packets into voice packets for all recipient user devices that operate in a voice call mode.

In case of the voice-to-text conversion, if the call conversion module 700 runs on the service provider server, the voice-to-text converter 704 may receive un-encoded voice packets from user device B, convert the un-encoded voice packets into text packets, and provide the text packets to the network operator for transmission to user device A. If the call conversion module 700 runs on the network operator server, the voice-to-text converter 704 may receive encoded voice packets from user device B, decode these voice packets, convert them into text packets, and transmit the text packets to user device A. If more than 2 user devices are involved in the call, the voice-to-text converter 704 may convert voice packets into text packets for all recipient user devices that operate in a text call mode.

Figure 8:
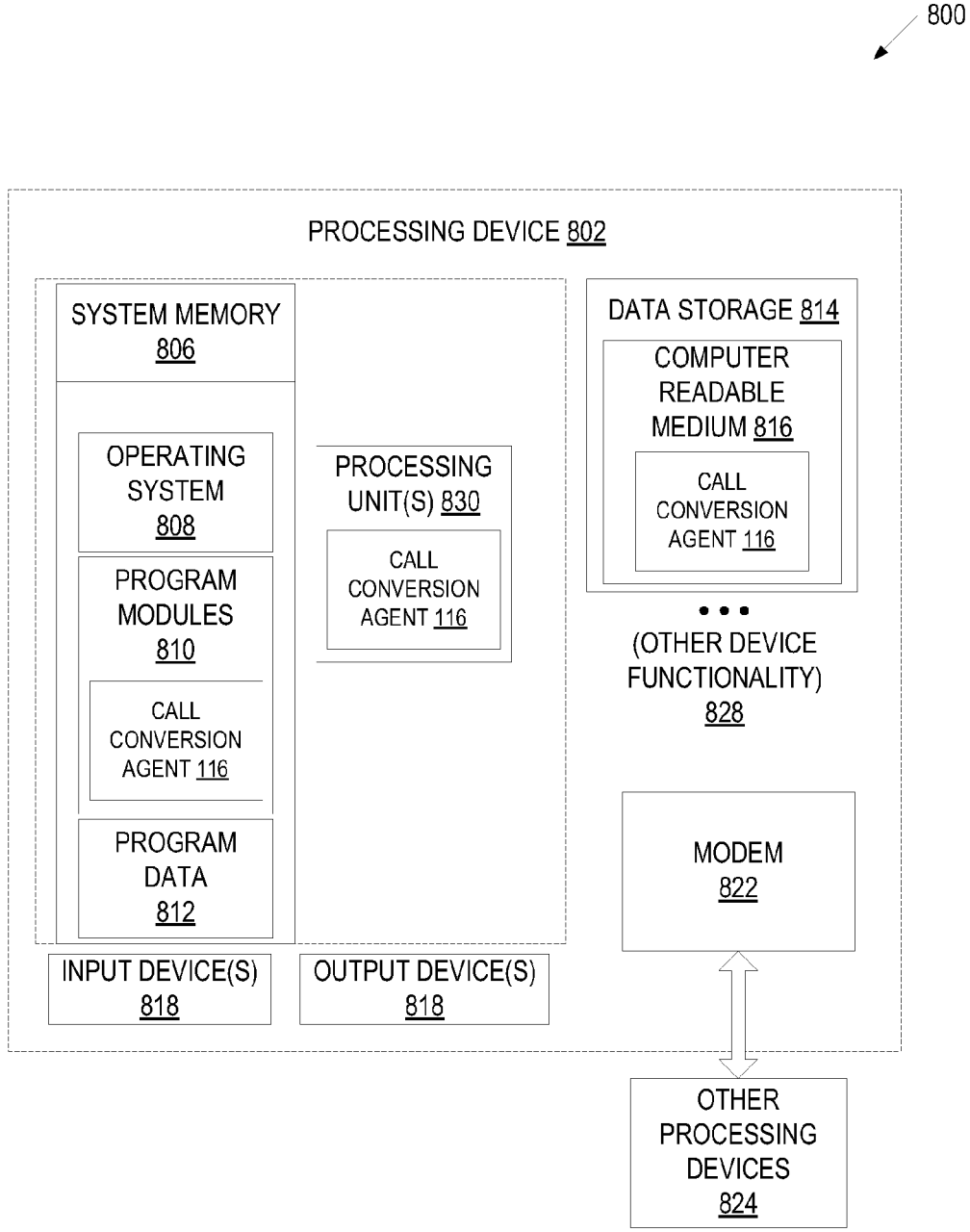
FIG. 8 is a block diagram illustrating an exemplary user device.

FIG. 8 is a block diagram illustrating an exemplary user device 800. The user device 800 may be the same as user device 102 of FIG. 1 and may be any type of computing device such as an electronic book reader, a PDA, a mobile phone, a laptop computer, a portable media player, a tablet computer, a camera, a video camera, a netbook, a desktop computer, a gaming console, a DVD player, a media center, and the like.

The user device 800 includes one or more processing units 804, such as one or more CPUs. The user device 800 also includes system memory 806, which may correspond to any combination of volatile and/or non-volatile storage mechanisms. The system memory 806 may store information which provides an operating system component 808, various program modules 810 including call conversion agent 116, program data 812, and/or other components. The user device 800 performs functions by using the processing unit(s) 804 to execute the call conversion agent 116 and other instructions provided by the system memory 806.

The user device 800 may also include a data storage device 814 that may consist of one or more types of removable storage and/or one or more types of non-removal storage. The data storage device 814 may include a computer-readable medium 816 on which is stored one or more sets of instructions (e.g., instructions of the call conversion agent 116) embodying any one or more of the methodologies or functions described herein. As shown, instructions of the call conversion agent 116 may also reside, completely or at least partially, within the system memory 806 and/or within the processing unit(s) 830 during execution thereof by the user device 800, the system memory 806 and the processing unit(s) 830 also constituting computer-readable media. The instructions of the call conversion agent 116 may further be transmitted or received over a network.

The user device 800 may also include one or more input devices 818 (keyboard, mouse device, specialized selection keys, etc.) and one or more output devices 820 (displays, printers, audio output mechanisms, etc.). The user device 800 may further include a wireless modem 822 to allow the user device 800 to communicate via a wireless network with other computing devices 824, such as remote computers, the service provider server 104, and so forth. The wireless modem 822 may allow the user device 800 to receive a voice call and also communicate with the service provider server 104 in a data mode. The wireless modem 822 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1×RTT), evaluation data optimized (EVDO), high-speed downlink packet access (HSDPA), WiFi, long term evaluation (LTE) and WiMax.

The above-enumerated list of modules is representative and is not exhaustive of the types of functions performed by the user device 800. As indicated by the label "Other Device Functionality" 828, the user device 800 may include additional functions.

FIGS. 9, 10A, 10B and 10C are flow diagrams of some embodiments of client-side methods. The methods are performed by processing logic that may comprise hardware (circuitry, dedicated logic, etc.), software (such as is run on a general purpose computer system or a dedicated machine), or a combination of both. In one embodiment, the methods are performed by a user device (e.g., a call conversion agent 116 of user device 102 of FIG. 1).

Figure 9:
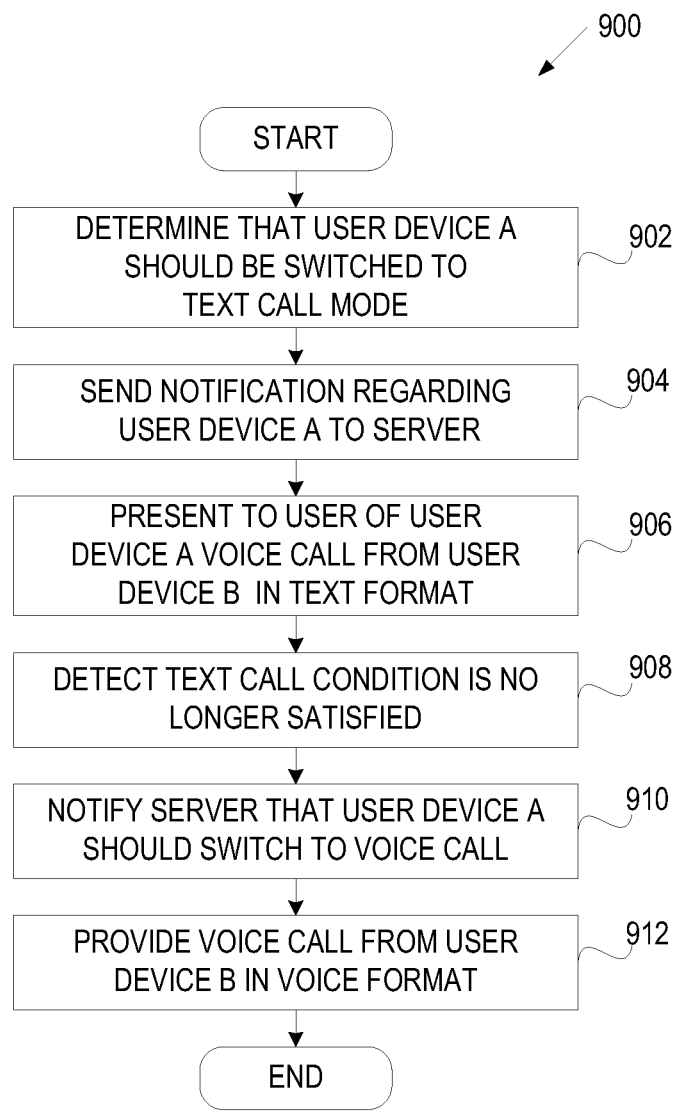
FIG. 9 is a flow diagram of one embodiment of a client-side method for dynamically switching between a voice call mode and a text call mode.

FIG. 9 is a flow diagram of one embodiment of a method 900 for dynamically switching between a voice call mode and a text call mode. At block 902, user device A detects that a text call condition is satisfied and therefore user device A should be switched to a text call mode. At block 904, user device A sends a notification about the switch to a server. The server may be a service provider server or a network operator server. At block 906, user device A presents the voice call from user device B in text format.

Subsequently, user device A detects that the text call condition is no longer satisfied (block 908) and notifies the server that user device A should switch back to a voice call mode (block 910). At block 912, user device A provides the call from user device B in voice format.

Figure 10A:
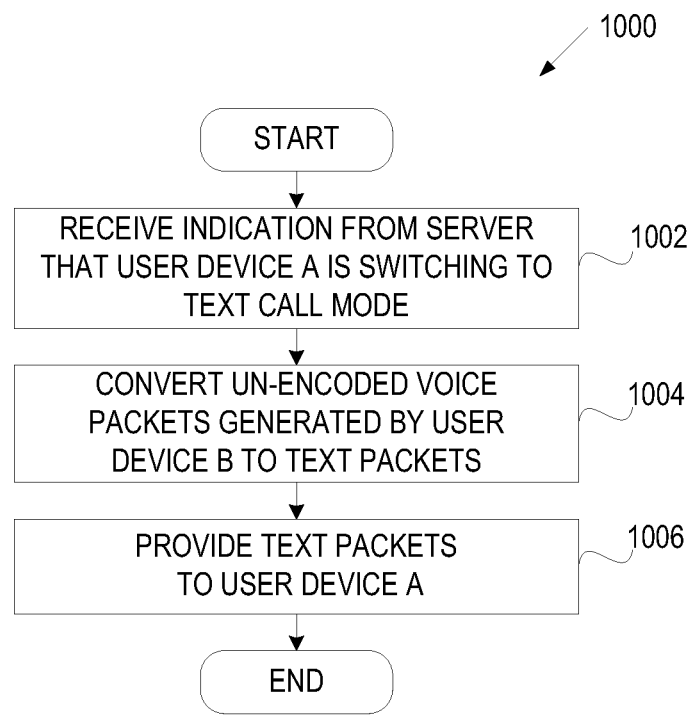
FIG. 10A is a flow diagram of another embodiment of a client-side method for converting a voice call into a text call.

FIG. 10A is a flow diagram of one embodiment of a method 1000 for converting a voice call into a text call. At block 1002, user device B receives an indication from the service provider server that user device A is switching to a text call mode. At block 1004, user device B converts un-encoded voice packets pertaining to the call with user device A to text packets. At block 1006, user device B provides the text packets to user device A via the network operator. If more than 2 participants are involved in the call, user device B may provide the text packets to all other participants that operate in a text call mode.

Figure 10B:
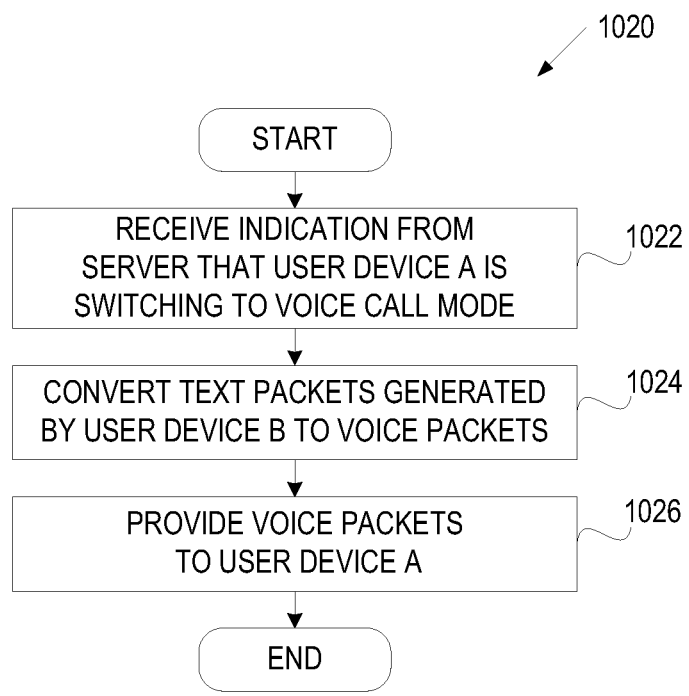
FIG. 10B is a flow diagram of one embodiment of a client-side method for converting a text call into a voice call.

FIG. 10B is a flow diagram of one embodiment of a method 1020 for converting a text call into a voice call. At block 1022, user device B receives an indication from the service provider server that user device A is switching from a text call mode to a voice call mode. If user device B operates in a text call mode, then at block 1024, user device B converts text packets pertaining to the call with user device A to voice packets (e.g., un-encoded or encoded voice packets). At block 1026, user device B provides the voice packets to user device A via the network operator.

Figure 10C:
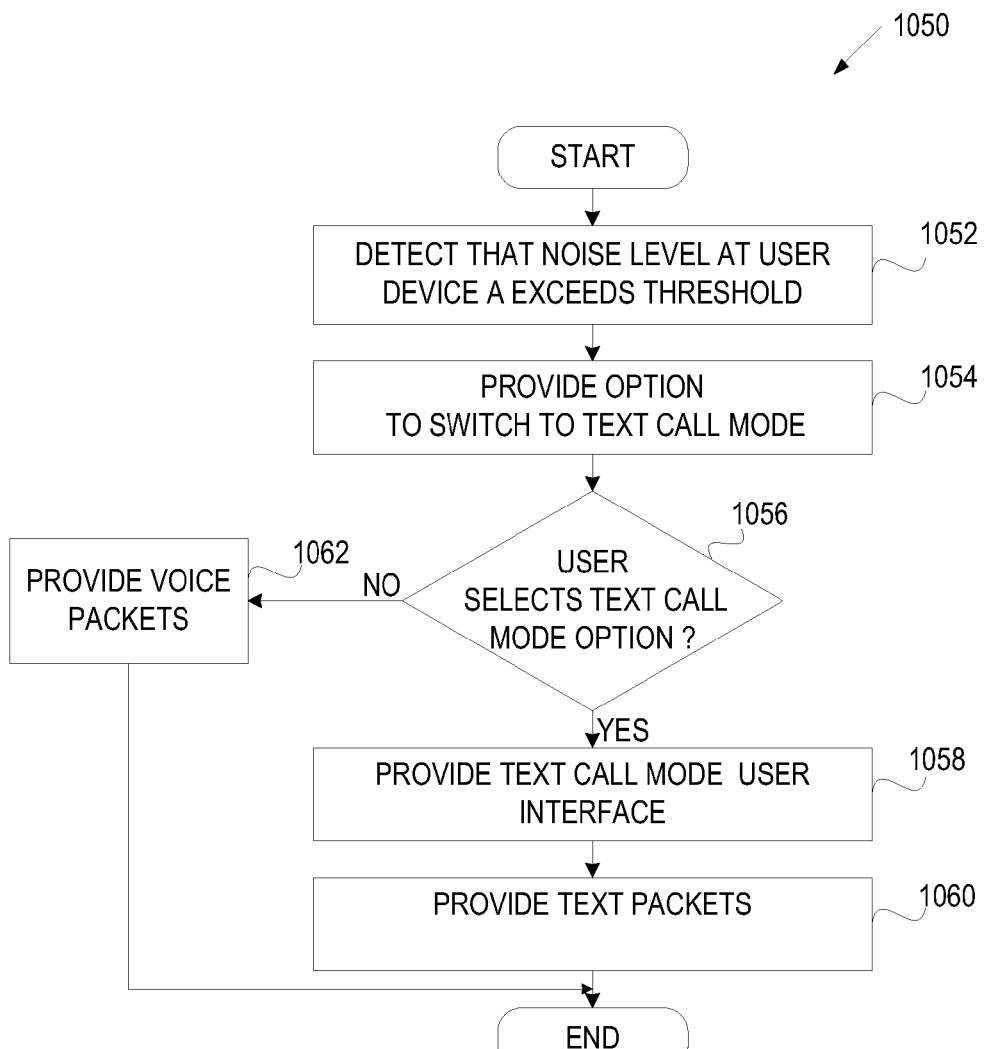
FIG. 10C is a flow diagram of one embodiment of a client-side method for providing a text call option to a user.

FIG. 10C is a flow diagram of one embodiment of a client-side method 1050 for providing a text call option to a user. At block 1052, user device A detects that a text call condition is satisfied. At block 1054, user device A provides to the user an option to switch to a text call mode. For example, user device A may display on the screen a message informing the user about a high noise level and may offer to switch to a text call mode (e.g., by activating a button or a link).

If the user does not select the text call mode option (block 1056), user device A provides voice packets to user device B. Otherwise, if the user selects the text call mode option, user device A presents a text call mode interface (block 1058). For example, user device A may present a user interface for allowing the user to enter a text message and for presenting the recipient's response in the text format. Alternatively, user device A may initiate a text messaging application previously installed on user device A. At block 1060, user device A sends to a server a notification about the switch and provides text packets to user device B via a network operator server. Alternatively, user device A converts text packets into voice packets and provides the voice packets to user device B.

Figure 11:
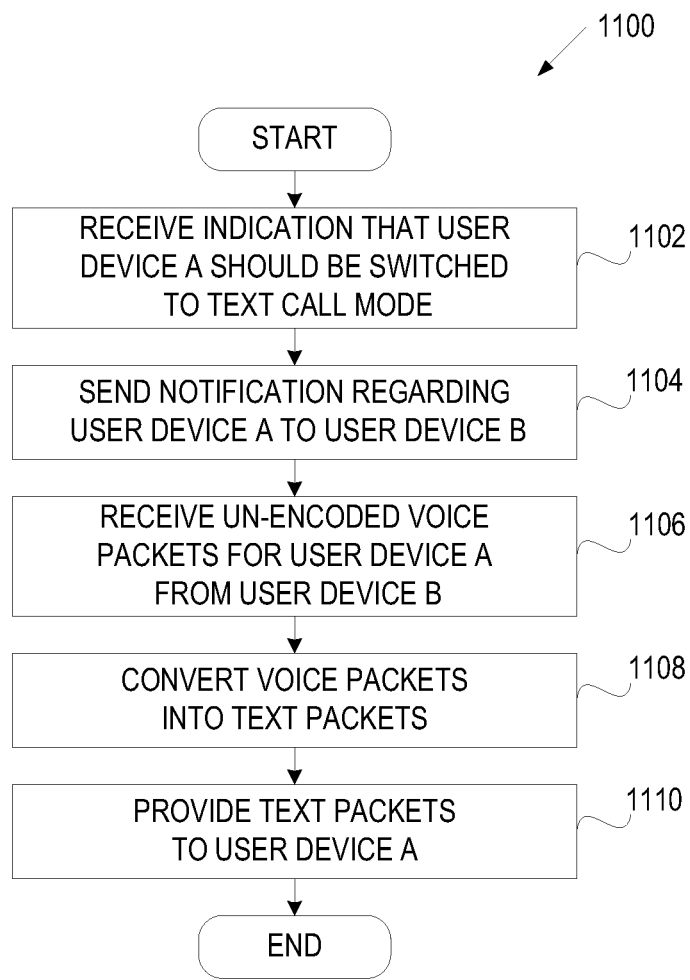
FIG. 11 is a flow diagram of one embodiment of a server-side method for converting a voice call into a text call.

FIG. 11 is a flow diagram of one embodiments of a server-side method 1100 for converting voice calls into text call. The method is performed by processing logic that may comprise hardware (circuitry, dedicated logic, etc.), software (such as is run on a general purpose computer system or a dedicated machine), or a combination of both. In one embodiment, the method is performed by a server (e.g., a call conversion manager 114 of service provider server 104 of FIG. 1).

At block 1102, the server receives an indication from user device A that user device A should be switched to a text call mode. At block 1104, the server sends a notification regarding user device A to user device B. At block 1106, the server receives un-encoded voice packets for user device A from user device B. At block 1108, the server converts the un-encoded voice packets into text packets. At block 1110, the server provides the text packets to user device A via the network operator.

Figure 12:
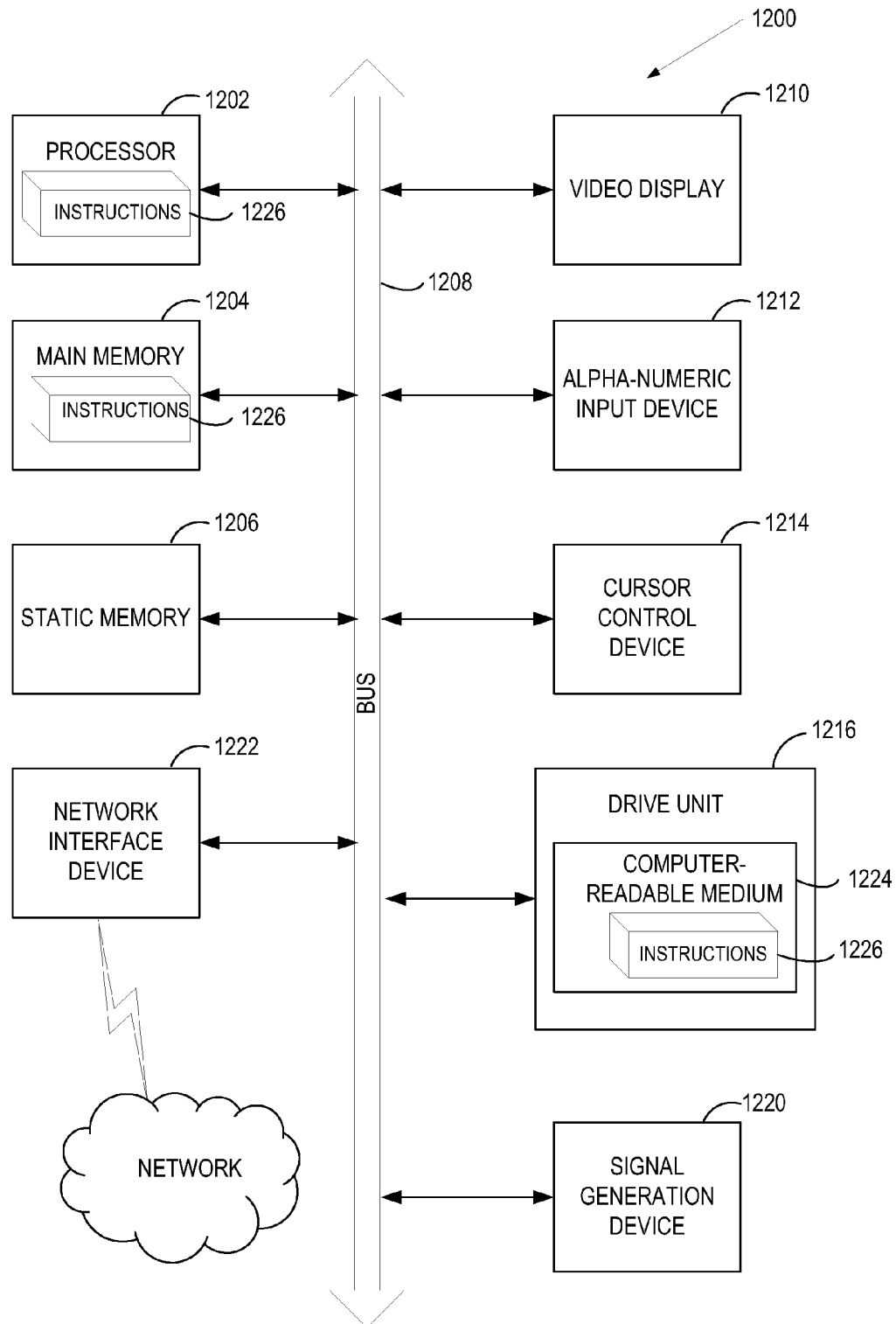
FIG. 12 illustrates an exemplary server facilitating conversion between voice calls and text calls of a user device.

FIG. 12 illustrates an exemplary server 1200 that facilitates conversion between voice calls and text calls. The server 1200 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1200 includes a processing system (processor) 1202, a main memory 1204 (e.g., read-only memory (ROM), flash memory, dynamic random access memory (DRAM) such as synchronous DRAM (SDRAM)), a static memory 1206 (e.g., flash memory, static random access memory (SRAM)), and a data storage device 1216, which communicate with each other via a bus 1206.

Processor 1202 represents one or more general-purpose processing devices such as a microprocessor, central processing unit, or the like. More particularly, the processor 1202 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1202 may also be one or more special-purpose processing devices such as an application specific integrated circuit (ASIC), a field programmable gate array (FPGA), a digital signal processor (DSP), network processor, or the like. The processor 1202 is configured to execute the call conversion manager 114 for performing the operations and steps discussed herein.

The computer system 1200 may further include a network interface device 1222. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1220 (e.g., a speaker).

The data storage device 1216 may include a computer-readable medium 1224 on which is stored one or more sets of instructions (e.g., instructions of call conversion manager 114) embodying any one or more of the methodologies or functions described herein. The call conversion manager 114 may also reside, completely or at least partially, within the main memory 1204 and/or within the processor 1202 during execution thereof by the computer system 1200, the main memory 1204 and the processor 1202 also constituting computer-readable media. The call conversion manager 114 may further be transmitted or received over a network 1220 via the network interface device 1222.

While the computer-readable storage medium 1224 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A non-transitory computer-readable medium including instructions that, when executed by a processing device, cause the processing system to perform operations comprising:
   receiving, at a server via a wireless network from a first user device, an indication that a signal strength of a wireless communication link, at the first user device and used to communicate with the server, is below a threshold;
   sending, by the server, a notification to a second user device notifying the second user device that the first user device is to be switched from a voice call mode to a text call mode;
   receiving, at the server from the second user device, a first voice data packet corresponding to a voice call with the first user device;
   converting, by the processing device at the server, the first voice data packet into a first text data packet; and
   sending, by the server via the wireless network, the first text data packet to the first user device.

2. The non-transitory computer-readable medium of claim 1 wherein the first voice data packet is generated by the second user device during the voice call.

3. The non-transitory computer-readable medium of claim 1 wherein:
   the first voice data packet is encoded by the second user device prior to being received at the server; and
   converting the first voice data packet into the first text data packet comprises decoding the first voice data packet.

4. The non-transitory computer-readable medium of claim 1 wherein the voice call comprises at least one of a teleconference call, a video conference call, or a web conference call.

5. The non-transitory computer-readable medium of claim 1 wherein the operations further comprise:
   receiving, at the server, a second text data packet from the first user device in response to the voice call from the second user device;
   converting, at the server, the second text data packet provided by the first user device into a second voice data packet; and
   sending the second voice data packet to the second user device.

6. The non-transitory computer-readable medium of claim 1 wherein the operations further comprise:
   receiving, at the server, an indication that the first user device is to be switched from the text call mode to the voice call mode;
   receiving, at the server from the second user device, a third voice data packet for the voice call with the first user device; and
   sending the third voice data packet to the first user device.

7. A method comprising:
   determining, by a processing device, that a signal strength of a wireless communication link, at a first user device and used to communicate with a server, is below a threshold;
   determining, by the processing device, that the first user device is to be switched from a voice call mode to a text call mode;
   sending, by the processing device to the server, an indication that the first user device is to be switched from the voice call mode to the text call mode, wherein the server is in communication with a second user device; and
   receiving, by the processing device from the server via the wireless communication link, a first text data packet corresponding to a voice call from the second user device.

8. The method of claim 7 wherein determining that the first user device is to be switched from the voice call mode to the text call mode is further based on a determination that the first user device is in a noisy environment.

9. The method of claim 7 wherein determining that the first user device is to be switched from the voice call mode to the text call mode is further based on a reception of a request from the user of the first user device to switch to the text call mode.

10. The method of claim 7 wherein the server is any one of a service provider server or a network operator server.

11. The method of claim 7 wherein determining that the first user device is to be switched from the voice call mode to the text call mode occurs during the voice call from the second user device or prior to the voice call from the second user device.

12. The method of claim 7 wherein the voice call from the second user device is presented to the user of the first user device in text format on at least one of the first user device or a third user device.

13. The method of claim 7 further comprising:
   converting, at the first user device, a voice data packet pertaining to the voice call from the second user device to a second text data packet.

14. The method of claim 7 further comprising:
   switching the first user device from the text call mode to the voice call mode upon detecting that a text call condition is no longer satisfied.

15. The method of claim 7 wherein the voice call comprises at least one of a point-to-point call, a teleconference call, a video conference call, or a web conference call.

16. The method of claim 7 wherein determining that the first user device is to be switched from the voice call mode to the text call mode comprises:
- upon determining that the signal strength is below the threshold, providing an option to switch from the voice call mode to the text call mode;
- receiving a selection of the option to switch from the voice call mode to the text call mode; and
- presenting a user interface facilitating user input of text data in response to the voice call from the second user device.

17. The method of claim 16 further comprising:
converting the text data into voice data.

18. A first user device comprising:
a memory; and
a processing device operatively coupled to the memory, the processing device to:
- receive an indication from a server that a signal strength of a wireless communication link, at a second user device and used to communicate with the server, is below a threshold;
- send a request to the server to change a quality of service of a call between the first user device and the second user device;
- convert a first voice data packet generated by the first user device during the call into a first text data packet; and
- send the first text data packet to the second user device.

19. The first user device of claim 18 wherein the request to change the quality of service of the call indicates a change from streaming call parameters to interactive data session parameters.

20. The first user device of claim 19 wherein the request to change the quality of service of the call indicates a change from parameters corresponding to a voice call mode to parameters corresponding to a text call mode.

21. The first user device of claim 18 wherein the processing device is further to:
- receive an indication from the server that the signal strength of the wireless communication link between the second user device and the server is above the threshold; and
- send a second voice data packet generated by the first user device during the call to the second user device.

22. The first user device of claim 18 wherein the call comprises at least one of a point-to-point call, a teleconference call, a video conference call, or a web conference call.

\* \* \* \* \*